United States Patent
Ponnuswamy et al.

(10) Patent No.: US 12,309,532 B1
(45) Date of Patent: May 20, 2025

(54) ULTRA-HIGH RESOLUTION CONCURRENT CAMERA STREAM SYSTEMS

(71) Applicant: Amazon Technologies, Inc., Seattle, WA (US)

(72) Inventors: Ajay Kumar Ponnuswamy, Renton, WA (US); Adriana Reus, Bellevue, WA (US); Sachin R Kothari, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 17/849,556

(22) Filed: Jun. 24, 2022

(51) Int. Cl.
| | |
|---|---|
| *H04N 7/18* | (2006.01) |
| *F25D 11/00* | (2006.01) |
| *H04N 23/90* | (2023.01) |

(52) U.S. Cl.
CPC ............ *H04N 7/181* (2013.01); *F25D 11/00* (2013.01); *H04N 7/188* (2013.01); *H04N 23/90* (2023.01); *F25D 2400/00* (2013.01); *F25D 2400/14* (2013.01); *F25D 2500/06* (2013.01); *F25D 2700/02* (2013.01); *F25D 2700/12* (2013.01)

(58) Field of Classification Search
CPC .... H04N 7/181; H04N 23/90; G06Q 30/0641; G16H 50/30; G06V 20/52; G06V 20/68; G06F 18/22; G06F 18/2148; G06F 3/0482; G09B 19/0092; H04L 67/02; H04L 67/10; G06T 5/73; G06T 2207/20192; F25D 2400/36; F25D 2700/06
USPC .......................................................... 348/159
See application file for complete search history.

(56) References Cited

U.S. PATENT DOCUMENTS

| | | | |
|---|---|---|---|
| 9,117,106 | B2 | 8/2015 | Dedeoglu et al. |
| 9,235,928 | B2 | 1/2016 | Medioni et al. |
| 9,473,747 | B2 | 10/2016 | Kobres et al. |
| 9,965,798 | B1* | 5/2018 | Vaananen ............... F25D 29/00 |
| 10,477,162 | B2* | 11/2019 | Jain .................. G08B 13/19654 |
| 10,641,543 | B2* | 5/2020 | Yeh ......................... F25D 23/12 |
| 10,716,192 | B1* | 7/2020 | Tsibulevskiy .......... H02J 7/0049 |
| 11,425,338 | B2* | 8/2022 | Kang ..................... G06V 20/68 |
| 2013/0284806 | A1 | 10/2013 | Margalit |
| 2016/0037230 | A1* | 2/2016 | van der Laan ...... H04N 21/472 |
| | | | 463/31 |
| 2016/0057394 | A1* | 2/2016 | Marutani ................ F25D 23/12 |
| | | | 348/143 |
| 2018/0059881 | A1* | 3/2018 | Agboatwalla ......... G06F 3/0482 |
| 2020/0088463 | A1* | 3/2020 | Jeong ...................... G06F 3/167 |
| 2020/0158417 | A1* | 5/2020 | Bechtle .................. G03B 15/00 |
| 2021/0041159 | A1* | 2/2021 | Uchida ................... F25D 11/02 |
| 2021/0254888 | A1* | 8/2021 | Cremaschi ......... G06Q 30/0268 |

(Continued)

*Primary Examiner* — Boubacar Abdou Tchoussou
*Assistant Examiner* — Asmamaw G Tarko
(74) *Attorney, Agent, or Firm* — Athorus, PLLC

(57) ABSTRACT

Described herein are systems and techniques for concurrently transmitting ultra-high-definition video data from multiple ultra-high-definition cameras to a single computing device without exceeding the bandwidth of the communication protocols on board the device. The systems use a serializer and deserializer configuration to serialize the multiple ultra-high-definition video streams and concurrently stream them to a deserializer located at the computing device, where a dual or quad deserializer is used to return the video data to a parallel format, the video data useful for making one or more determinations about an environment around the system.

20 Claims, 7 Drawing Sheets

(56) References Cited

U.S. PATENT DOCUMENTS

| | | | | |
|---|---|---|---|---|
| 2021/0335427 A1* | 10/2021 | Kim | ........................ | H01L 25/18 |
| 2023/0194148 A1* | 6/2023 | Kempfle | ................ | H04N 23/90 |
| | | | | 62/449 |
| 2023/0194149 A1* | 6/2023 | Kempfle | ............... | F25D 23/028 |
| | | | | 62/449 |
| 2023/0194158 A1* | 6/2023 | Kempfle | ............... | F25D 29/005 |
| | | | | 62/125 |
| 2023/0392858 A1* | 12/2023 | Bihr | ....................... | H04N 7/183 |

\* cited by examiner

ULTRA-HIGH RESOLUTION CONCURRENT CAMERA STREAM SYSTEMS

BACKGROUND

Numerous systems across industries use video data from one or more cameras and/or sensor data from one or more sensors to perform operations including tracking, monitoring, visualizing, and otherwise interacting with an environment. Every data stream brought into a computing device, including streamed video data requires computing resources. Depending on the type and configuration of computing device, the computing resources may be maxed out or exceeded by video or data requirements. For ultra-ultra-high-definition cameras, the bitrate of an encoded sequence of images may be a limiting factor for transmission of the video data. As increasingly more devices become integrated with sensors, including cameras, and space for computing devices is limited on-board such devices, the computing resources may be consumed or exceeded by the received data.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DETAILED DESCRIPTION

Figure 1:
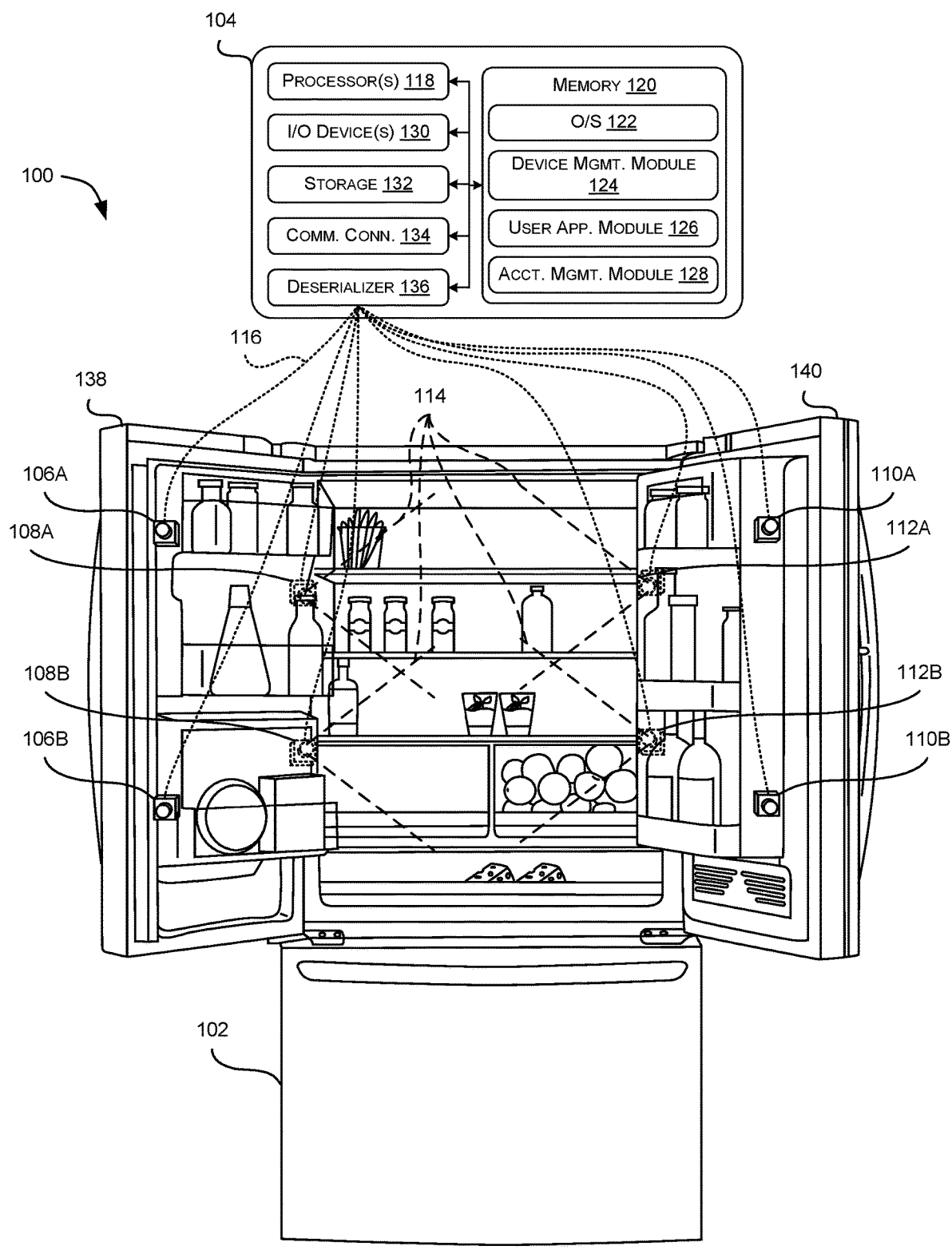
FIG. 1 illustrates a refrigerator equipped with sensor arrays including multiple ultra-ultra-high-definition cameras, according to at least one example.

The systems and methods described herein provide systems and techniques for streaming and managing ultra-high-definition video data concurrently from multiple ultra-high-definition cameras with a single computing device on-board a system such an appliance or vehicle. The on-board system may be limited in terms of computation power by space or cost constraints that limit the number or capabilities of computing devices incorporated therein. The multiple ultra-high-definition cameras may exceed a bandwidth capability for a particular network, especially on an on-board device streaming from multiple ultra-high-definition cameras. The systems described herein employ a serializer/deserializer ("SerDes") configuration to concurrently stream from the multiple cameras to a single on-board computing device.

The systems also enable switching between the various streams based on relevance or other determinations using firmware or software implementations (e.g., using external sensor data and/or camera data used on raw camera data before processing to enable switching) without exceeding a bandwidth of the network. In particular, the systems and techniques described herein enable connection to greater numbers of ultra-high-definition cameras than typical approaches. The systems described herein can enable frames from different video streams to be streamed side-by-side or interleaved into a single frame. Additionally, the systems described herein enable simplified wiring harnesses with a single wire per channel over a typical parallel configuration. In addition, SerDes receivers may be employed to transmit data over long distances without the signal degradation experienced with parallel busses ultimately offering increased reliability and fidelity over parallel busses.

In an illustrative example, multiple ultra-high-definition (e.g., 4K) cameras are connected to a single computing device via a SerDes configuration with each camera coupled with a serializer and one or more serializers communicably coupled with the deserializer at the computing device. The multiple cameras are on-board a device, such as a consumer device equipped with a single computing device with limited bandwidth over a local network on-board the consumer device. Firmware of the computing device may configure the SerDes configuration for the cameras to choose which of the multiple cameras to stream from at any particular time and can also re-configure the SerDes to change video routing as needed based on bandwidth requirements. Software stored with the on-board computing device can additionally arbitrate which of the camera streams to select for further processing so that total bandwidth remains below an encoder limit of the device.

In a particular example, the computing device may have encoding that is limited to 4K at 120 frames per second and therefore may only support four cameras streaming 4K resolution at 30 frames per second. The SerDes configuration described herein may enable the device to run eight cameras concurrently and manage the encoding to receive streamed data from only four of the cameras, though all eight may be running. The eight cameras may each be equipped with or coupled with a serializer, that may be in a contained unit with the camera, and may communicate over a coaxial cable to the deserializer at or adjacent the computing device. The serializer may, in some examples, compress a digital image from the camera to a specific resolution and converts the digital image that has been compressed to the specific resolution into a serial format. In some examples, the serializer may not compress the digital image from the camera. The serializer may pack the data according to a specific data protocol. The coaxial cable couples the serializer to the deserializer to convey the digital image that is in the specific resolution and in the serial format to the deserializer. The image conveyed by the coaxial cable and received by the deserializer is converted into a parallel format and decompressed by the deserializer, to be video encoded and/or used for one or more implementations by the computing device.

In the particular example, the consumer device may include a refrigerator equipped with cameras to capture image data of the interior of the refrigerator to maintain information and update systems related to the contents of the refrigerator, automate delivery of products, warn of expiration, identify, and track removal of items from the refrigerator for use, and other such techniques. The refrigerator may communicate the video data from the cameras to a refrigerator computing device that is in communication with a management system to perform one or more of the operations mentioned above based on user interactions and/or item characteristics of products within the refrigerator. In some examples, the management system may store the video data and process the video data to determine inventory, expiration dates, quantity, etc. associated with the inventory within the refrigerator. Additional functionality may include tracking removal of items from a refrigerator in a commercial setting, for example to update a virtual cart of products based on a user removal of the item from the refrigerator. In some examples, the management system may be configured to communicate with user devices associated with the management system such as a counter-top device, device built-in to the refrigerator, and/or a mobile device. For example, in response to receiving video data of an item being removed and depleted or nearing depletion, the management system may provide a notification to the user device with the information for use by a user.

Though particular examples are described herein with respect to a refrigerator system or a vehicle system, the systems and techniques described herein may be implemented in various other systems and devices that include computing devices communicating with ultra-high-definition cameras in a manner that may exceed a bandwidth capability of the device.

Figure 2:
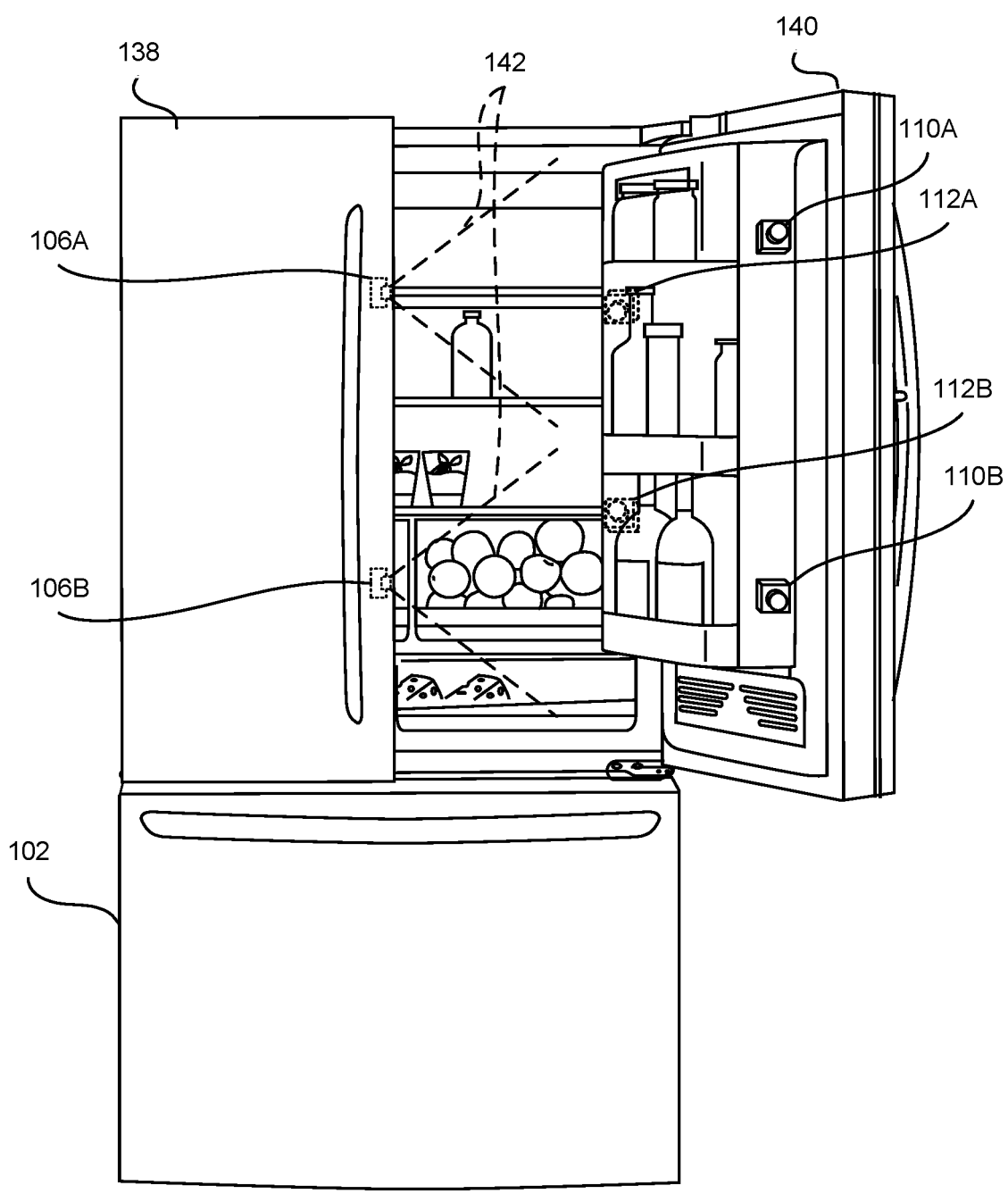
FIG. 2 illustrates the refrigerator of FIG. 1, depicted with a first door closed, according to at least one example.

Turning now to the figures, FIG. 1, illustrates a refrigerator system 100 equipped with sensor arrays including multiple ultra-high-definition cameras, according to at least one example. As illustrated, the refrigerator system 100 includes a refrigerator 102, one or more camera units, and a computing device 104. The camera units include camera 106A, 106B, 108A, 108B, 110A, 110B, 112A, and 112B (collectively cameras 106-112). The cameras 106-112 may be located throughout the refrigerator 102. For example, each compartment, such as a shelf, tray, or drawer, can include a camera 106-112 positioned to capture an image of the corresponding shelf, tray, or compartment. In some examples, the cameras 106-112 may be positioned on or adjacent the doors to capture images of the interior of the refrigerator 102, and cameras 106A, 106B, 110A, and 110B may be positioned to capture images of the doors of the refrigerator when one of the doors is closed while the other is open, as depicted in FIG. 2. As shown in FIG. 1, four cameras, including cameras 108A, 108B, 112A, and 112B are directed towards the interior compartment of the refrigerator, though additional or fewer camera units may be used in some examples. The cameras 106-112 can include a camera capable of capturing images in the infrared spectrum and/or a camera capable of capturing images in the visible spectrum. In other embodiments, the cameras 106-112 can correspond to a complementary metal-oxide-semiconductor (CMOS) sensor capable of capturing both infrared and visible spectrum images. In some examples, the camera units may include sensor arrays that may be used to detect temperature, humidity, door position, and other such sensor data within the refrigerator and corresponding to operation of the refrigerator and/or the contents therein.

As illustrated in FIG. 2, the refrigerator 102 is shown with a first door 138 closed while a second door 140 is open. In this configuration, the cameras 106A and 106B are positioned to capture image data of the second door 140 to observe and capture image data corresponding to interactions with items positioned in the storage areas on the second door 140. Therefore, the cameras 106A, 106B, 110A, and 110B may be directed outwards from the edge of the first door 138 and the second door 140 respectively to capture image data of those environments respectively. In this manner, the cameras 106-112 may capture image data representative of an entire environment within the refrigerator.

The cameras 106-112 are ultra-high-definition cameras capable of capturing image and/or video data at high resolutions, e.g., 4K Ultra ultra-high-definition (UHD), 8K UHD, or other such ultra-high-definition video modes. The cameras 106-112 may be initiated upon opening of one of the first door 138 or the second door 140 of the refrigerator to begin streaming video data. The video data captured by the cameras 106-112 may consume the bandwidth of the network on the refrigerator system 100 and therefore, the system needs to be capable of identifying video streams to use and route those video streams for use in identifying interactions with items inside the refrigerator.

The cameras 106-112 may include additional components, such as sensor arrays and serializer components for serializing the video data from the cameras. The sensor arrays may include temperature sensors, humidity sensors, position sensors, light sensors, and other such sensors that may be used to monitor operation of the refrigerator and/or of the contents within the refrigerator. The serializer is communicably coupled to the cameras 106-112 and may be coupled in a 1:1 ratio, with one serializer per camera. The serializer converts the digital video at the high resolution into a serial format and thereby the digital video may be conveyed by coaxial (coax) cable to the computing device 104. In some examples, other communication channels and/or protocols may be implemented, however, the communication protocols and channels may have further bandwidth limits that reduce or limit available data to transmit to the computing device. In some examples, the cameras 106-112 and/or the serializers may also include image compressing components to compress the video data from a first resolution and format to a second resolution and format that may consume less bandwidth.

In an example, the cameras 106-112 may be configured to activate upon opening of the first door and/or the second door 140 automatically, in response to sensor data indicative of the first door 138 and/or the second door 140 opening. In this manner, rather than attempting to identify relevant cameras and only then starting up the cameras 106-112 to gather data, the refrigerator system 100 enable all of the cameras 106-112 to begin gathering video data. Upon determining relevance of the video data and/or the views from the cameras, the video data may be routed using the SerDes configuration. In the example, it is faster for the refrigerator system 100 to engage all of the cameras 106-112 and choose video data based on relevance rather than determining relevance and subsequently activating relevant cameras. It is faster in this manner and therefore more efficient to stream concurrently from all of the cameras 106-112 and to drop, using the SerDes configuration, irrelevant video data. Irrelevant video data may be determined using external signals, such as the sensor arrays, or may be determined using computer vision techniques in some examples. For instance, a signal that the first door 138 is closed may be used to indicate that the cameras 106A and 106B are relevant while the cameras 110A and 110B are not relevant as they are no longer directed towards the interior of the refrigerator 102, as depicted in FIG. 2.

The cameras 106-112 are communicably coupled by communication connections 116 to the deserializer 136. The communication connections 116 may include coax cable that is capable of communicating serial format data to the computing device 104. The video data may be received by the deserializer 136, which may be embodied in the computing device 104 or may be separate from the computing device 104 and communicably coupled with the computing device 104.

The deserializer 136 recovers the video data back from the serial format. In some examples, the deserializer 136 may include an image decompressor and a digital image encoder. The deserializer 136 receives and converts the data from the serializers into a parallel format. The video data may be recovered back to the original format and/or resolution at the computing device using the deserializer 136.

The refrigerator system 100 includes a computing device 104. The computing device 104 includes a memory 120, one or more processor(s) 118, additional storage 132, communication connections 134, and input/output devices 130. The processor(s) 118 may be implemented as appropriate in hardware, computer-executable instructions, firmware, or combinations thereof. Computer-executable instruction or firmware implementations of the processor(s) 118 may include computer-executable or machine executable instructions written in any suitable programming language to perform the various functions described.

Because space within the refrigerator system 100 may be limited for placing additional or different computing devices, and/or for bulky wiring harnesses, the SerDes configuration described above enables the refrigerator system 100 to implement each of the ultra-high-definition cameras described above without exceeding limits on the communication protocols within the refrigerator system 100 that would require additional expense and components to overcome in a typical system. In this manner, the SerDes configuration provides for an efficient system to maximize use of the cameras and minimize space required for computing devices within the refrigerator system 100.

The memory 120 may store program instructions that are loadable and executable on the processor(s) 118, as well as data generated during the execution of these programs. The memory 120 may be volatile (such as random-access memory (RAM)) and/or non-volatile (such as read-only memory (ROM), flash memory, etc.). The additional storage 132, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 120 may include multiple different types of memory, such as static random access memory (SRAM), dynamic random access memory (DRAM) or ROM. Turning to the contents of the memory 120 in more detail, the memory 120 may include an operating system 122 and one or more application programs or services for implementing the features disclosed herein including at least a device management module 124, a user application module 126, and an account management module 128.

The device management module 124 may provide for management of the refrigerator 102 and/or the refrigerator system 100 as part of a larger connected system, such as shown and described with respect to FIG. 3 below. The device management module 124 may track interactions with the refrigerator 102, for example to track items placed in or removed from the refrigerator 102 or other interactions. The device management module 124 may also manage the components of the refrigerator 102, such as cooling, lighting, and other components.

In an example, the user application module 126 may provide or host a mobile application for users to interact with. The mobile application may be used to interact to view the contents of the refrigerator 102 and/or to interact with the computing device 104 in one or more ways.

The account management module 128 may provide for management of user accounts associated with the refrigerator system 100. In an example, the user accounts may include access to other connected devices, shopping accounts, in-store accounts, virtual shopping carts, and the like. The account management module 128 may store and access user account information such as the identifying information requested by the user application module 126 to display at a user device and may also store and access payment information, address information, or other such information entered by users.

Figure 3:
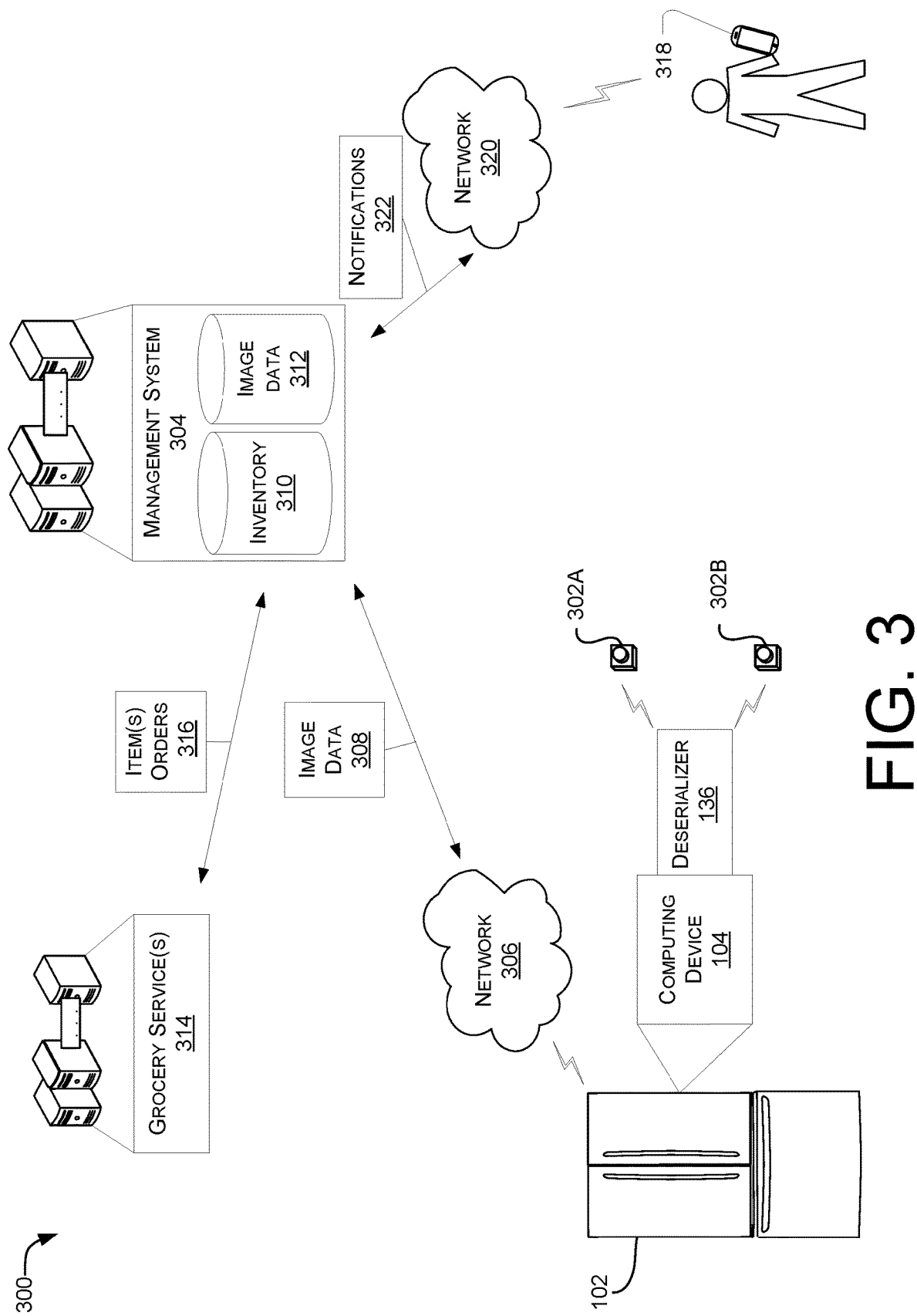
FIG. 3 illustrates an example system architecture for a management system of a sensor-equipped device, according to at least one example.

FIG. 3 illustrates an example block diagram 300 of a management system 304 for monitoring refrigerator usage using one or more ultra-high-definition cameras 302A and 302B (collectively cameras 302) mounted within the refrigerator 102. The refrigerator 102 may be the refrigerator as shown and described with respect to FIGS. 1 and 2 above. The cameras 302 and the refrigerator 102 may be configured to monitor the inventory of the refrigerator 102 and capture image data 308 (e.g., video, images, and the like) associated with the inventory of the refrigerator (e.g., fruit, vegetables, beverages, condiments, etc.). Additionally, or alternatively, the cameras 302 and/or refrigerator 102 may contain computer vision systems, internet-of-things (IoT), temperature sensors, humidity sensors, acoustic sensors, contact and pressure sensors, illuminators, projectors, contacting and/or non-contacting radar, and/or barcode scanners, to name a few examples. For example, illuminators and/or projectors may assist in capturing image data using the cameras 302 by providing infrared and/or visible light at various intensities.

The cameras 302 communicate, via communication connections, such as over coaxial cables, with the computing device 104. The computing device 104 may perform some or all of the determinations described in the example above, such as user interactions, item identification, item tracking, and the like. The computing device 104 may, in some examples, communicate the image data 308 over a network 306, such as the internet, to the management system 304 for determination or use as described herein. Accordingly, functions described herein as performed by the management system 304 and/or the computing device 104 may be performed in whole or in part on one or both of the devices, including other distributed (e.g., cloud) computing devices.

In some examples, the management system 304 may, upon receiving the image data 308, store the image data in an image database 312. The management system 304 may process the image data 308 using various techniques, such as a machine learned models, to determine item interactions, inventory, expiration dates, quantity, etc. associated with the inventory within the refrigerator 102. For example, computer vision capabilities of the refrigerator 102 using the cameras 302 may enable the management system 304 to compute estimated volume, weight, and/or quantity data associated with items in the refrigerator 102. Additionally, the management system 304 may include an inventory module 310, which may store information associated with items located in the refrigerator 102. For example, upon receiving the image data 308, the management system 304 may update the inventory module 310 to reflect a current quantity of the item.

In some examples, the management system 304 may be configured to communicate with user devices associated with the management system 304, such as a counter-top device and/or a mobile device 318. For example, in response to receiving image data 308, the management system 304 may send, to the counter-top device and/or the mobile device 318, a notification 322 associated with the image data 308 over a network 320 such as the internet, a local area network, or other such wired or wireless network.

The notification 322 may contain a variety of information. For example, the management system 304 may communicate with various third parties, such as grocery service(s) 314 and/or nutrition databases. For example, in response to receiving image data 308, the management system 304 may determine that an item may expire. Based on past usage, the management system 304 may send, to the grocery service(s) 314, an item order 316, which may contain a purchase order for the item approaching expiration. Additionally, the management system 304 may send item information to a nutrition database. For example, the management system 304 may, in response to receiving image data 308 associated with an item, send information relating to the item to a nutrition database, such as a nutritionist or recipe service. The nutrition database may send, to the management system 304, information relating to the item such as nutrition information, suggested recipes incorporating the item, and health benefits associated with the item, to name a few examples. In some examples, the item information from the nutrition database may be sent as a notification to the counter-top device and/or the mobile device 318.

As an illustrative example, the refrigerator 102 may send, to the management system 304, image data 308 of carrots captured by the cameras 302 and conveyed through the SerDes configuration described herein to the computing device 104. Based at least in part on the image data 308, the management system 304 may determine that the carrots are nearing expiration. In response to receiving item information for carrots, the nutrition database may send, to the management system 304, a recipe which uses carrots, such as roasted carrots or carrot cake. The management system 304 may send the recipe to the countertop device and/or the mobile device 318, preventing the carrots from going to waste.

In the current example, the image data 308, notifications 322, and item orders 316, as well as other data, may be transmitted between various systems using networks, generally indicated by networks 306 and 320. The networks 306 and 320 may be any type of network that facilitates compunction between one or more systems and may include one or more cellular networks, radio, Wi-Fi networks, short-range or near-field networks, infrared signals, local area networks, wide area networks, the internet, and so forth. In the current example, each network 306 and 320 are shown as separate networks but it should be understood that two or more of the networks may be combined or the same.

The example shown in FIG. 3 is illustrative of how a refrigerator 102 equipped with ultra-high-definition cameras may be implemented as part of a larger overall system. The cameras 302 may be capable of capturing higher resolution image data than other systems due to the use of the SerDes configuration for transmitting image data from the cameras 302 to the computing device 104 and/or management system 304. Additional systems, such as the vehicle of FIG. 6 may also implement the SerDes configuration as described herein for efficiently communicating ultra-high-definition video data from one or more cameras to an on-board computing device.

Figure 4:
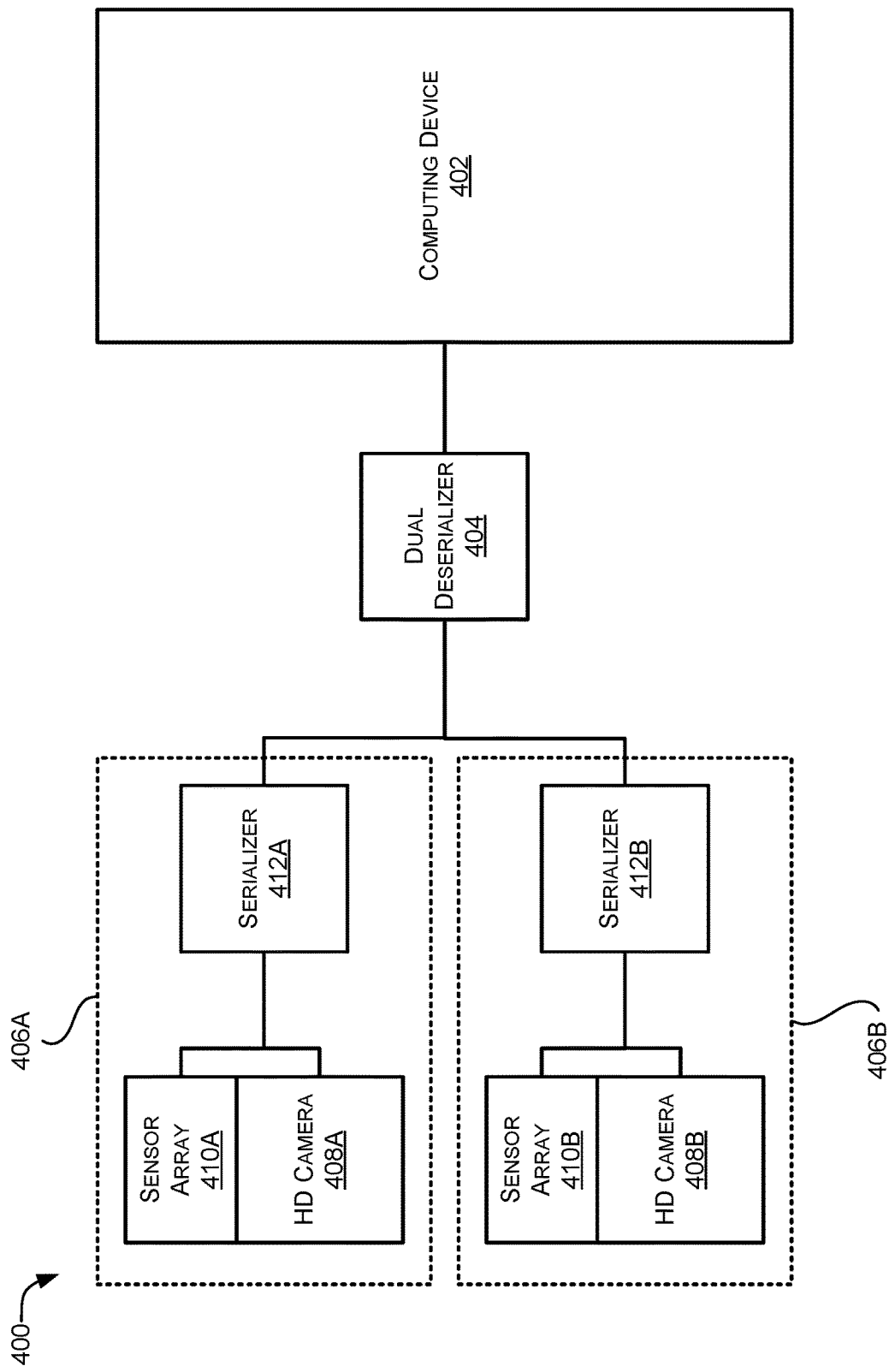
FIG. 4 illustrates a block diagram of a serializer/deserializer configuration for concurrently streaming ultra-high-definition video data from multiple cameras to a single computing device, according to at least one example.

FIG. 4 illustrates a block diagram 400 of a serializer/deserializer configuration for concurrently streaming ultra-high-definition video data from multiple cameras to a single computing device, according to at least one example. The serializer/deserializer configuration (SerDes configuration) is used to transpose data from the ultra-high-definition cameras to the computing device 402 within the limits of the communication channels, e.g., bandwidth and computational resource limits.

In the block diagram 400, a first camera unit 406A and a second camera unit 406B are shown communicably coupled with a computing device 402. The computing device 402 may be a computing device as described herein and may be an on-board computing device of a connected product, such as the refrigerator 102 described with respect to FIG. 1. The first camera unit 406A and the second camera unit 406B (collectively camera units 406) may be used to capture video data in high definition of an environment. the video data may be used by the computing device to make one or more determinations, such as to identify items, determine an interaction, plan a path, or other such actions.

The camera units 406 include ultra-high-definition cameras 408A and 408B that capture ultra-high-definition video data of an environment. The camera units 406 also include sensor arrays 410A and 410B that may include motion sensors, temperature sensors, humidity sensors, position sensors, light sensors, and other such sensors that may be used to monitor operation of the refrigerator and/or of the contents within the refrigerator.

The camera units 406 also include serializers 412A and 41B, with one serializer per ultra-high-definition camera 408A and 408B. In some examples, a single serializer may be coupled to multiple ultra-high-definition cameras. The serializers 412A and 412B convert the digital video at the high resolution into a serial format and thereby the digital video may be conveyed by coaxial (coax) cable to the computing device 402. In some examples, the ultra-high-definition cameras 408A and 408B and/or the serializers may also include image compressing components to compress the video data from a first resolution and format to a second resolution and format that may consume less bandwidth.

The camera units 406 are communicably coupled by communication connections to the dual deserializer 404. The communication connections may include coax cable that is capable of communicating serial format data to the computing device 402. The video data may be received by the dual deserializer 404, which may be embodied in the computing device 402 or may be separate from the computing device 402 and communicably coupled with the computing device 402. The dual deserializer 404 is configured to deserialize multiple concurrent inputs from the multiple camera units 406.

The dual deserializer 404 recovers the video data back from the serial format. In some examples, the dual deserializer 404 may include an image decompressor and a digital image encoder. The dual deserializer 404 receives and converts the data from the serializers into a parallel format. The video data may be recovered back to the original format and/or resolution at the computing device using the dual deserializer 404.

Figure 6:
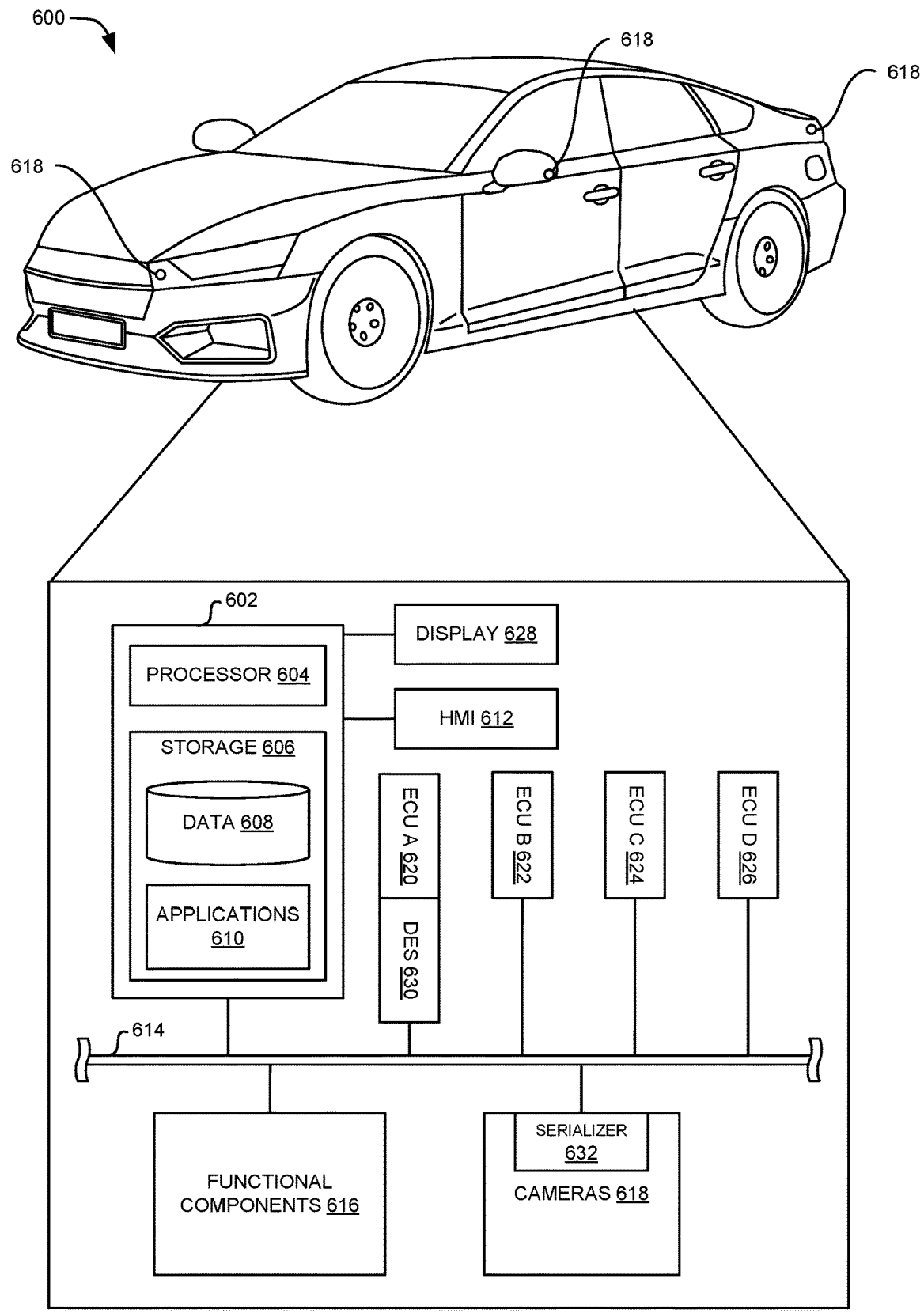
FIG. 6 illustrates a block diagram of a vehicle system, according to at least one example.

Any suitable computing system or group of computing systems can be used for performing the operations or methods described herein and the SerDes configuration as described herein may be used in numerous environments and systems. For example, FIG. 6 illustrates a vehicle system including a computing device 502 and multiple ultra-high-definition cameras that concurrently stream to an on-board computing device.

Figure 5:
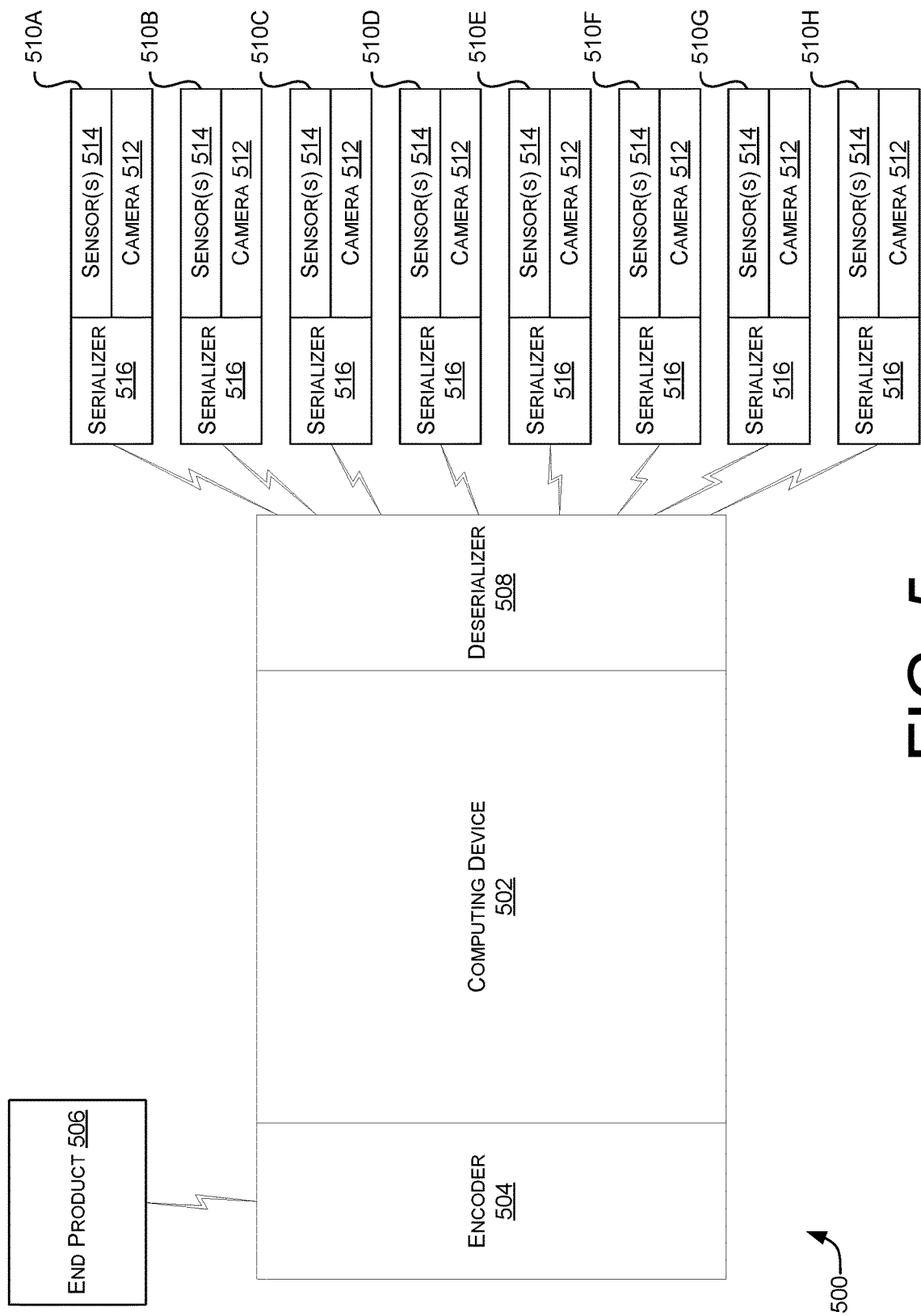
FIG. 5 illustrates a system for selecting data streams from multiple ultra-high-definition cameras at a single computing device, according to at least one example.

FIG. 5 illustrates a system 500 for selecting data streams from multiple ultra-high-definition cameras at a single computing device, according to at least one example. In the system 500, a single computing device 502 is used to receive data from multiple sensor units 510A, 510B, 510C, 510D, 510E, 510F, 510G, 510H (collectively sensor units 510). The computing device 502 includes a deserializer 508 used to deserialize data from the sensor units 510 and also includes an encoder 504 for transmitting data to an end product 506 for use. For example, the end product 506 may include a system such as the appliance of FIGS. 1 and 2 or the vehicle system of FIG. 6. The encoder 504 has bandwidth limits that may limit the conveyance of sensor data from all of the sensor units 510 to the end product 506. Therefore, communication is limited between the computing device 502 and the sensor units 510 as well as from the computing device 502 to the end product 506. The sensor units 510 each include a camera 512, such as an ultra-high-definition camera, one or more sensors 514, and a serializer 516 as described herein.

While the system 500 is operating, data from the cameras 512 of the sensor units 510 is conveyed via the serializers 516 and deserializer 508 to the computing device 502. At the computing device, one or more of the data streams from the cameras 512 may be dropped based on the bandwidth limits of the encoder 504. Accordingly, the data streams from the cameras 512 may be evaluated for relevance and/or ranked in priority. In some examples, each of the data streams may receive an individual priority ranking, and in some examples, the data streams may be grouped into groups of relevant and irrelevant data streams.

The computing device 502 uses software switching to determine data streams to pass through the encoder 504 and which data streams to drop. The software switching determines relevance for the data streams. In some examples, the relevance may be determined based on sensor data from the sensors 514 that may be conveyed in parallel with the serialized data streams from the cameras 512, for example from a sensor array that includes a motion sensor, ToF sensor, non-external sensor (e.g., based on content of the video stream from the camera), or other such sensor. Relevance may be determined based on identifying an interaction, identifying a region of interest (e.g., such as when the door of a refrigerator is open or a turn signal on a vehicle indicates lateral motion to another lane on the road), or identifying motion or other such information. In the particular example of FIGS. 1 and 2, upon both doors of the refrigerator 102 being opened, the computing device 502 may detect that both doors are open based on door opener sensor data and accordingly determine that data streams coming from the cameras 106A, 106B, 110A, and 110B positioned at the ends of the doors, is not relevant because they do not provide a view of the refrigerator 102 to log or track interactions with items within the refrigerator 102 when both doors are open. In contrast, in FIG. 2, when only one door is open, the cameras 106A and 106B may be determined to be relevant because they provide a view of the open door, and this relevance determination may be based on door opening sensor data indicating that the left door is closed while the right door is open. In some examples, the sensors 514 may convey motion data that may be used to determine relevance, for example, with relevance determined based on viewing motion that may be associated with an interaction. Other types of sensor data may similarly be used to determine relevance by the computing device 502. In some examples, the software at the computing device, stored in a non-transitory computer-readable media, may include rules for determining relevance that may be expert-defined based on sensor data such as door open status, motion status, distance, etc. In some examples, the computing device 502 may implement one or more machine learning or other approaches for determining relevance of data streams from the cameras 512 for switching and conveying via the encoder 504 for use by the end product 506, which may embody the computing device 502.

FIG. 6 illustrates a block diagram of a vehicle system 600, according to some embodiments. The vehicle system 600 may include a computing system 602 configured to communicate over an in-vehicle network 614. The vehicle system 600 also includes cameras 618 positioned at different locations around the vehicle for capturing video data of the environment around the vehicle system 600. The cameras 618 may include ultra-high-definition cameras as described herein for capturing ultra-high-definition image data. Ultra-high-definition cameras are implemented on the vehicle system 600 such that the surrounding environment may be better understood by the vehicle system 600 due to the high definition of the video data. Limitations of size, space, and weight may limit the computing devices that can be implemented in the vehicle system 600 and therefore may impose bandwidth limits on the amount of ultra-high-definition video data that may be processed by the components of the vehicle system 600. The cameras 618 may include a serializer 632, as discussed herein, to serialize data from the cameras 618 for passing to a single computing device concurrently. The vehicle system 600 may use the video data for safety features, driving assist features, self-driving features, and other implementations within the vehicle system 600 for navigating and operating the vehicle system 600. In some examples, a single electronic control unit (ECU) may be used to receiving the video data from the cameras 618 (e.g., ultra-high-definition cameras) for use by a computing system 602 of the vehicle system 600.

The computing system 602 includes a processor 604 and storage 606. While a vehicle system 600 is shown in FIG. 6, the example components as illustrated are not intended to be limiting. Indeed, the vehicle system 600 may have more or fewer components, and additional or alternative components and/or implementations may be used. It should be noted that the use of a vehicle system 600 environment is illustrative, as the components and/or functionality may be utilized in other types of systems such as flight control system in an airplane, or a medical device or industrial machine.

The vehicle system 600 may include various types of automobile, crossover utility vehicle (CUV), sport utility vehicle (SUV), truck, recreational vehicle (RV), boat, plane or other mobile machine for transporting people or goods. In many cases, the vehicle system 600 may be powered by an internal combustion engine. As another possibility, the vehicle system 600 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 600 may vary, the capabilities of the vehicle system may correspondingly vary. As some other possibilities, vehicle system 600 may have different capabilities with respect to passenger capacity, towing ability and capacity, and storage volume.

The computing system 602 may include a Human Machine Interface (HMI) 612 and a display 628 for user interaction with the computing system 602. In some examples the display 628 may include a vehicle infotainment system including one or more displays. The HMI 612 may be configured to support voice command and BLUETOOTH™ interfaces with the driver and driver carry-on devices, receive user input via various buttons or other controls, and provide vehicle status information to a driver or other vehicle system 600 occupants. For instance, the computing system 602 may interface with one or more buttons or other HMI 612 configured to invoke functions on the computing system 602 (e.g., steering wheel audio buttons, a push-to-talk button, instrument panel controls, etc.). The computing system 602 may also drive or otherwise communicate with the display 628 configured to provide visual output to vehicle occupants, e.g., by way of a video controller. In some cases, the display 628 may be a touch screen further configured to receive user touch input via the video controller, while in other cases the display 628 may be a display only, without touch input capabilities. In an example, the display 628 may be a head unit display included in a center console area of the vehicle system 600. In another example, the display 628 may be a screen of a gauge cluster of the vehicle system 600.

The computing system 602 may further include various types of computing apparatus in support of performance of the functions of the computing system 602 described herein. In an example, the computing system 602 may include one or more processors 604 configured to execute computer instructions, and a storage 606 medium on which computer-executable instructions and/or data may be maintained. A computer-readable medium (also referred to as a processor-readable medium or storage 606) includes any non-transitory (e.g., tangible) medium that participates in providing data (e.g., instructions) that may be read by a computer (e.g., by the one or more processors 604). In general, the processor 604 receives instructions and/or data, e.g., from the storage 606, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 606 may include divisions for data 608 and applications 610. The data 608 may store information such as databases and other such information. The applications 610 may store the computer-executable instructions or other such instructions executable by the processor 604.

The computing system 602 may be configured to communicate with mobile devices of the vehicle system 600 occupants. The mobile devices may be any of various types of portable computing device, such as cellular phones, tablet computers, smart watches, laptop computers, portable music players, or other devices capable of communication with the computing system 602. As with the computing system 602, the mobile device may include one or more processors configured to execute computer instructions, and a storage medium on which the computer-executable instructions and/ or data may be maintained. In some examples, the computing system 602 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 602 may communicate with the mobile device over a wired connection, such as via a USB connection between the mobile device and a Universal Serial Bus (USB) subsystem of the computing system 602.

The computing system 602 may be further configured to communicate with other components of the vehicle system 600 via one or more in-vehicle networks 614. The in-vehicle networks 614 may include one or more of a vehicle controller area network (CAN), an Ethernet network, or a media-oriented system transfer (MOST), as some examples. The in-vehicle networks 614 may allow the computing system 602 to communicate with other units of the vehicle system 600, such as ECU A 620, ECU B 622, ECU C 624, and ECU D 626. The ECUs 620, 622, 624, and 626 may include various electrical or electromechanical systems of the vehicle system 600 or control various subsystems of the vehicle system 600. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes): a body control module configured to manage various power control functions such as exterior lighting, interior lighting, keyless entry, remote start, and point of access status verification (e.g., closure status of the hood, doors and/or trunk of the vehicle system 600); a radio transceiver module configured to communicate with key fobs or other vehicle system 600 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 600 location and heading information, and various other vehicle ECUs configured to corporate with the computing system 602. The subsystems controlled by the various ECUs may include functional components 616 of the vehicle system 600 including elements such as the powertrain, engine, brakes, lights, steering components, and the like. Additionally, some or all of the functional components 616 may include cameras 618 as well as additional sensors equipped to the vehicle system 600 for detecting various states, positions, proximity, temperature, and the like of the vehicle system 600 and subsystems thereof. The ECUs 620, 622, 624, 626 may communicate with the computing system 602 as well as the functional components 616 and the cameras 618 over the in-vehicle network 614. While only four ECUs are depicted in FIG. 6, any number (more or fewer) of ECUs may be included in vehicle system 600.

In a particular example, ECU A 620 is configured to receive video data from the cameras 618, which may also include various other sensor data from sensors associated with the cameras 618. The cameras may serialize the ultra-high-definition video data with a serializer at or near the cameras 618 and communicate the serialized video data to the deserializer 630. The deserializer 630 deserializes the video data and passes the video data on, in parallel format to the ECU A 620. ECU A 620 may use the video data for one or more vehicle-related functions as described herein or otherwise. ECU A 620 may also determine relevance of the video data and may pass the video data on to the computing system 602 or one or more other ECUs for further computation and determinations.

Figure 7:
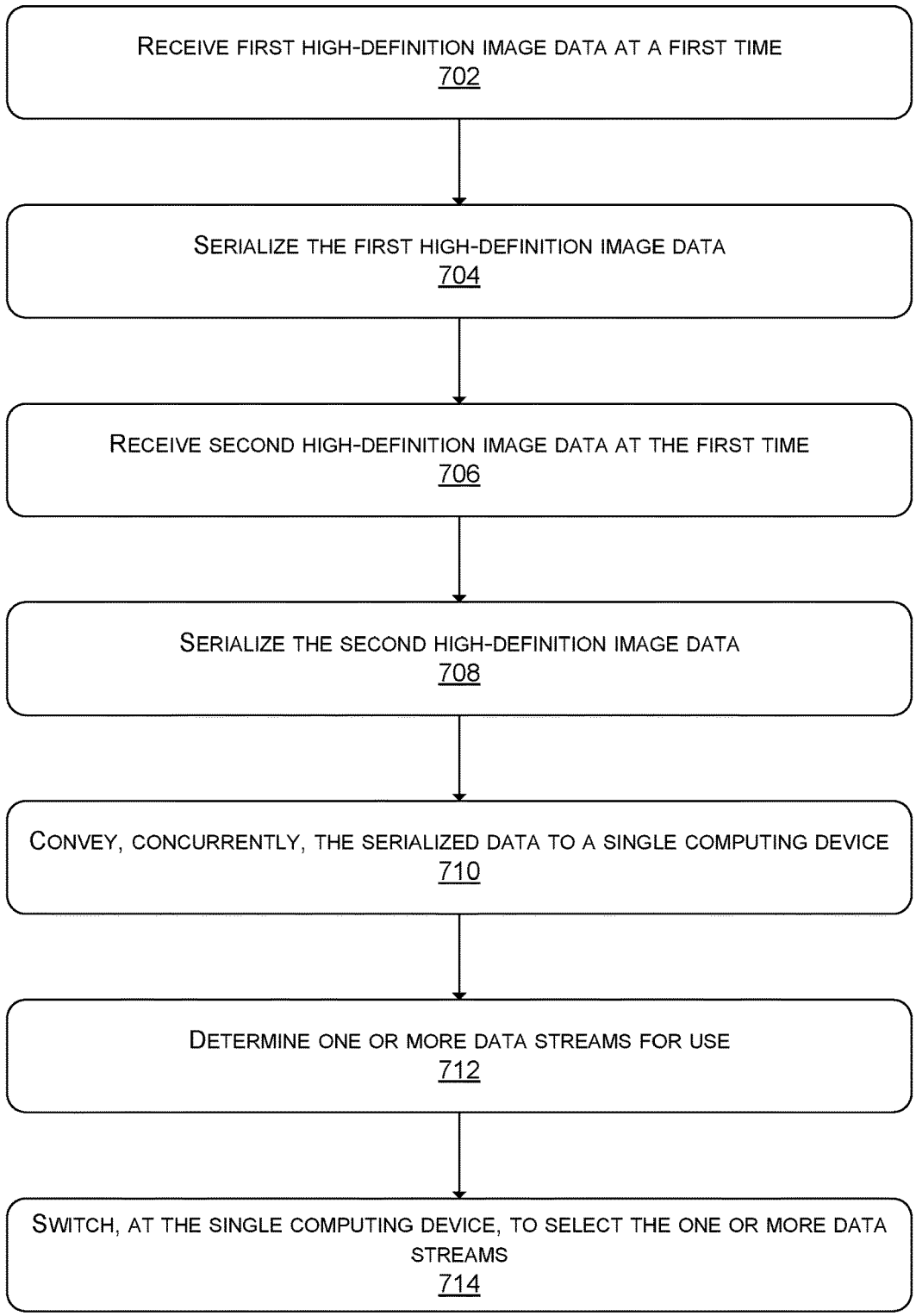
FIG. 7 illustrates a process for handling data from one or more sensor arrays to a single computing component associated with a device, according to at least one example.

FIG. 7 illustrates a flow diagram of a method according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 7 illustrates a process 700 for handling data from one or more sensor arrays to a single computing component associated with a device, according to at least one example. The data may be data that exceeds a bandwidth of a communication protocol, encoder, or computing device, and therefore cannot be directly communicated from the one or more sensor arrays concurrently to the single computing component. The data may include ultra-high-definition image data from ultra-high-definition cameras, or may be other similar data.

At 702, the process 700 includes receiving first ultra-high-definition image data at a first time. The first ultra-high-definition image data may include additional data such as sensor data or other types of data rather than image data. The first ultra-high-definition image data is received from a first imaging device. The imaging device may, in some examples, be part of a sensing unit included in a consumer device that includes a single computing device where the image data may be processed.

At 704, the process 700 includes serializing the first ultra-high-definition image data. The first ultra-high-definition image data is serialized by a serializer that may be included in the sensing unit. The serializer may change the format or type of the data and may also include a compression system to compress the first ultra-high-definition image data for transmission.

At 706, the process 700 includes receiving second ultra-high-definition image data at the first time. The second ultra-high-definition image data may include additional data such as sensor data or other types of data rather than image data. The second ultra-high-definition image data is received from a second imaging device. The imaging device may, in some examples, be part of a sensing unit included in a consumer device that includes a single computing device where the image data may be processed.

At 708, the process 700 includes serializing the second ultra-high-definition image data. The second ultra-high-definition image data is serialized by a serializer that may be included in the sensing unit. The serializer may change the format or type of the data and may also include a compression system to compress the first ultra-high-definition image data for transmission.

At 710, the process 700 includes conveying, concurrently, the serialized data to a single computing device. The serialized first and second data may be conveyed via a deserializer that receives the serialized data and transforms it into parallel data at the computing device. The computing device may then process the video data, and may use the sensor data from the first sensing unit and/or the second sensing unit to determine a relevance for dropping video data in excess of a bandwidth capacity of the computing device.

At 712, the process 700 includes determining one or more data streams received at the single computing device for use. The use may be for identifying objects, identifying interactions, determining distance and/or space, or other such determinations. The one or more data streams received at the single computing device may exceed available bandwidth for an encoder of the single computing device. Accordingly, the process 700 includes determining one or more of the data streams as relevant for the use. In some examples, the relevance may be determined based on sensor data that may be conveyed in parallel with the serialized data, for example from a sensor array that includes a motion sensor, ToF sensor, non-external sensor (e.g., based on content of the video stream from the camera), or other such sensor. Relevance may be determined based on identifying an interaction, identifying a region of interest (e.g., such as when the door of a refrigerator is open or a turn signal on a vehicle indicates lateral motion to another lane on the road), or identifying motion or other such information.

At 714, the process 700 includes switching the data streams to the encoder based on the one or more data streams identified for use at 712. For example, in a system with eight ultra-high-definition cameras, the encoder may only be capable of receiving and/or conveying data from four simultaneously and the other four incoming data streams from the other cameras may be dropped. Accordingly, the relevant streams determined at 712 may be selected for sending to the encoder of the single computing device for use by the system while the other data streams are dropped. In this manner, any number of data streams may be selected for use based on relevance, so long as the encoder has bandwidth. In some examples, the single computing device may drop all but the one or more relevant data streams. In some examples, the single computing device may only drop as many data streams as required to fit within the bandwidth limits of the encoder.

While the foregoing is described with respect to the specific examples, it is to be understood that the scope of the description is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. An appliance comprising:
   a refrigeration compartment for storing items at a refrigerated temperature;
   a first door that provides access into an interior of the refrigeration compartment;
   a sensor array configured to detect sensor data comprising a state of the first door;
   a first camera configured to capture first image data of a first portion of the interior of the refrigeration compartment;

a first serializer communicably coupled with the first camera and configured to receive and serialize the first image data into a serial format;

a second camera configured to capture second image data of a second portion of the interior of the refrigeration compartment;

a second serializer communicably coupled with the second camera and configured to receive and serialize the second image data into the serial format;

a deserializer communicably coupled with the first serializer and the second serializer and configured to deserialize the first image data and the second image data from the serial format into a parallel data format;

one or more processors; and one or more computer-readable media storing instructions that, when executed by the one or more processors, cause the one or more processors to perform operations comprising:

receiving the sensor data from the sensor array;

determining an open state of the first door based on the sensor data;

receiving the first image data from the deserializer;

receiving the second image data from the deserializer;

subsequent to the receiving of both of the first image data and the second image data from the deserializer, determining, based at least in part on content of the first image data and the second image data, a relevance of the first image data and the second image data, and determining, based at least in part on the relevance of the content of the first image data and the second image data, to drop one of the first image data or the second image data; and determining a user interaction with an item within the interior of the refrigeration compartment based on the first image data or second image data.

2. The appliance of claim 1, wherein:

the sensor array comprises a first sensor component and a second sensor component;

the first camera, first serializer, and first sensor component are integrated together in a first unit; and the second camera, second serializer, and second sensor component are integrated together in a second unit.

3. The appliance of claim 2, wherein the sensor data comprises temperature data, humidity data, and door status data.

4. The appliance of claim 1, wherein the computer-readable media storing instructions that, when executed by the one or more processors, cause the one or more processors to perform additional operations comprising:

initiating, in response to determining that the first door is open, image capture by the first camera and the second camera.

5. A system, comprising:

a first camera configured to capture first image data of an environment;

a first serializer communicably coupled with the first camera and configured to receive and serialize the first image data into a serial format;

a second camera configured to capture second image data of the environment;

a second serializer communicably coupled with the second camera and configured to receive and serialize the second image data into the serial format; and a deserializer communicably coupled with the first serializer, the second serializer, and a computing device, the deserializer configured to deserialize the first image data and the second image data from the serial format into a parallel format and communicate the first image data and the second image data to the computing device, wherein, subsequent to the computing device receiving both of the first image data and the second image data from the deserializer, the computing device:

determines, based at least in part on content of the first image data and the second image data, a relevance of the first image data and the second image data; and determines, based at least in part on the relevance of the content of the first image data and the second image data, to drop one of the first image data or the second image data.

6. The system of claim 5, wherein:

the first camera is a first ultra-high-definition camera;

the first image data is first ultra-high-definition image data;

the second camera is a second ultra-high-definition camera;

the second image data is second ultra-high-definition data; and the first ultra-high-definition data and second ultra-high-definition data exceed a capability associated with the system.

7. The system of claim 5, further comprising a sensor array configured to receive sensor data associated with the environment.

8. The system of claim 7, wherein the computing device drops one of the first image data or the second image data based at least in part on the sensor data.

9. The system of claim 8, wherein the computing device drops one of the first image data or the second image data in response to a determination that the first camera or the second camera is directed away from a region of interest in the environment.

10. The system of claim 8, wherein the determination that the first image data or the second image data are relevant comprises a determination that the first camera or the second camera is directed toward an area of interest in the environment.

11. The system of claim 5, further comprising an encoder configured to communicate the first image data or the second image data with an external system, and wherein the computing device drops one of the first image data or the second image data based at least in part on a determination that the first image data and the second image data together exceed a bandwidth limit of the encoder.

12. The system of claim 5, wherein the computing device is a computing device configured to manage an operation of an appliance.

13. The system of claim 5, further comprising determining, using the computing device, an interaction with an item in the environment based on the first image data or the second image data.

14. A method, comprising:

receiving first ultra-high-definition image data with a first imaging device at a first time;

serializing the first ultra-high-definition image data to generate first serialized data;

receiving second ultra-high-definition image data with a second imaging device at the first time;

serializing the second ultra-high-definition image data to generate second serialized data;

conveying the first serialized data to a computing device;

conveying the second serialized data to the computing device;

deserializing the first serialized data and the second serialized data at the computing device, wherein, after the computing device deserializes the first serialized data and the second serialized data, the computing device:

determines, based at least in part on content of the first ultra-high-definition image data and the second ultra-high-definition image data, a relevance of the first ultra-high-definition image data and the second ultra-high-definition image data; and determines, based at least in part on the relevance of the content of the first ultra-high-definition image data and the second ultra-high-definition image data, to drop one of the first serialized data or the second serialized data based at least in part on the relevance.

15. The method of claim 14, wherein:

conveying the first serialized data to the computing device comprises conveying the first serialized data over a first coaxial cable; and conveying the second serialized data to the computing device comprises conveying the second serialized data over a second coaxial cable.

16. The method of claim 14, wherein:

receiving the first ultra-high-definition image data and the second ultra-high-definition data comprises using a first communication protocol;

conveying the first serialized data and the second serialized data comprises using a second communication protocol; and after deserializing the first serialized data and the second serialized data, the first ultra-high-definition image data and second ultra-high-definition image data are communicated to the computing device using the first communication protocol.

17. The method of claim 14, further comprising:

determining first relevance of the first ultra-high-definition image data and second relevance of the second ultra-high-definition image data;

selecting the first ultra-high-definition image data or the second ultra-high-definition image data based on the first relevance and the second relevance; and configuring the first serializer, second serializer, and deserializer to route the first ultra-high-definition image data or the second ultra-high-definition image data to the computing device in response to selecting the first ultra-high-definition image data or the second ultra-high-definition image data.

18. The method of claim 17, wherein selecting the first ultra-high-definition image data or the second ultra-high-definition image data comprises arbitrating between the first ultra-high-definition image data and the second ultra-high-definition image data to remain within a bandwidth limit.

19. The method of claim 18, wherein the bandwidth limit is associated with an encoder configured to communicate the first ultra-high-definition image data or the second ultra-high-definition image data with an external system.

20. The method of claim 14, further comprising determining, using the computing device, an interaction with an item in an environment based on the first ultra-high-definition image data or the second ultra-high-definition image data.

* * * * *